United States Patent [19]

Ohme

[11] 4,370,073
[45] Jan. 25, 1983

[54] CONNECTOR HUB FOR GEODESIC DOME STRUCTURES

[76] Inventor: Dale A. Ohme, 3337 - 31st Ave. S., Minneapolis, Minn. 55406

[21] Appl. No.: 190,021

[22] Filed: Sep. 23, 1980

[51] Int. Cl.³ .......................... F16D 1/00; F16D 3/00; F16L 41/00
[52] U.S. Cl. .................................... 403/172; 403/218; 403/379; 403/255; 52/81; 256/65
[58] Field of Search ............... 403/171, 172, 174, 176, 403/177, 189, 191, 234, 237, 263, 264, 255, 230, 356, 7, 8, 11, 217, 20, 21, 379, 406, 219; 52/80, 81, 648, DIG. 10; 256/65, 66, 67

[56] References Cited
U.S. PATENT DOCUMENTS

| | | | |
|---|---|---|---|
| 3,486,278 | 12/1969 | Woods | 52/81 |
| 3,635,509 | 1/1972 | Birkemier et al. | 52/81 X |
| 4,069,832 | 1/1978 | Bingham | 403/172 X |
| 4,136,985 | 1/1979 | Taul | 403/218 X |
| 4,194,851 | 3/1980 | Litterfield | 403/218 |

*Primary Examiner*—Wayne L. Shedd
*Attorney, Agent, or Firm*—John W. Adams

[57] ABSTRACT

A connector hub made in a single integrally cast unit for connecting the ends of the stringer frame members of a geodesic dome structure, said hub being characterized by a plurality of pairs of spaced apart flange elements defining stringer receiving slots arranged in generally radially extending relation around the central axis of the hub unit with stiffening web elements disposed between adjacent slots, to provide an extremely strong and rigid connector hub for the stringers which is also specifically designed to abut the ends of the stringer elements to provide additional rigidity for the stringer connection.

1 Claim, 3 Drawing Figures

CONNECTOR HUB FOR GEODESIC DOME STRUCTURES

BACKGROUND OF THE INVENTION AND PRIOR ART

In the past, various connectors have been designed for providing a suitable connecting joint between the radially extending stringer frame elements for a geodesic dome structure. The problem that exists with the prior art connectors is, that they do not provide the desired rigidity necessary for a stable geodesic dome structure, and furthermore, the prior art connecting hubs require special cutting and shaping of the stringer elements to be connected. The present invention not only provides an extremely rigid structural connecting unit, but also greatly facilitates assembly with the stringer elements of the dome structure.

KNOWN PRIOR ART

The following is the prior art with which the inventor is familiar at this time: U.S. Pat. Nos. 3,844,074 (Ahern)—3,635,509 (Birkemier et al)—3,486,278 (B. L. Woods) and 3,186,522 (G. W. McCauley).

All of said patents are pertinent since they all show various connector hub constructions. None of these patents, however, shows the combination of an integrally cast connection hub unit which incorporates radially extending stringer receiving slots formed by pairs of spaced apart flange elements with the inner ends of the slots bevelled to abut the ends of the stringer elements and having connecting webs between adjacent slots with provision for inserting a plurality of connector bolts or pins through said flanges and the stringer elements disposed in said slots.

DESCRIPTION OF PREFERRED EMBODIMENT

A connector hub unit H is illustrated, and includes a plurality of radially extending circumferentially spaced stringer receiving slots S respectively formed between pairs of space apart flange elements 10. The inner ends of the slots S are beveled so that they define a plan disposed substantially at right angles to the longitudinal axis of the stringers received in the slots. This permits the squared ends of the stringer elements 11 to be firmly abutted against the beveled end surfaces 10a of each of the slots S.

Figure 2:
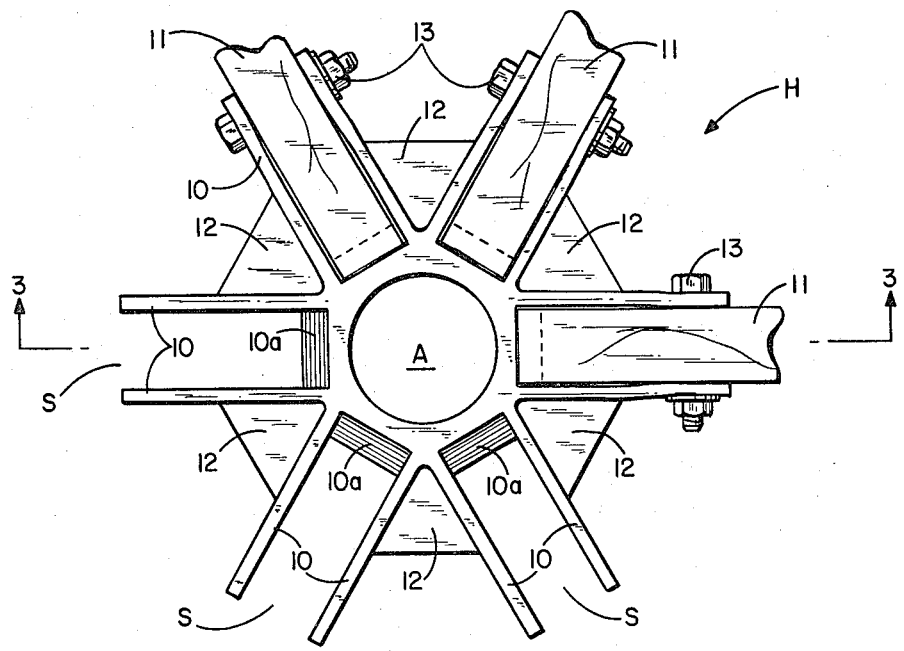
FIG. 2 is a bottom plan view of a connector hub unit embodying this invention.
Figure 3:
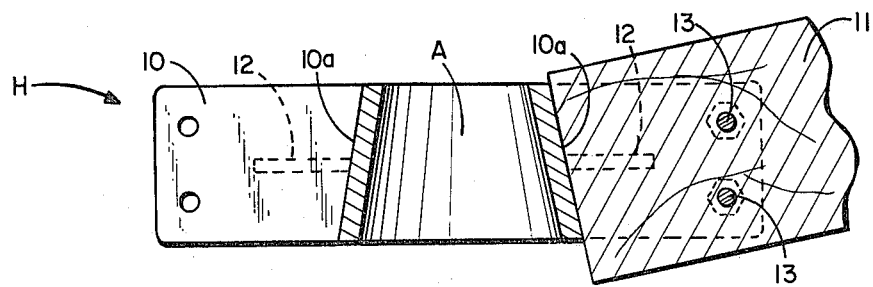
FIG. 3 is a vertical sectional view taken substantially along the line 3—3 of FIG. 2 showing a stringer attached to the hub element.

The center of the hub unit H has a frusto-conical opening A as best shown in FIGS. 2 and 3. The tapered inner wall surfaces of the center opening A, permit a substantially uniform wall thickness to be provided between the beveled inner ends 10a of the slots S, thus providing for an efficient material utilization and design.

Figure 1:
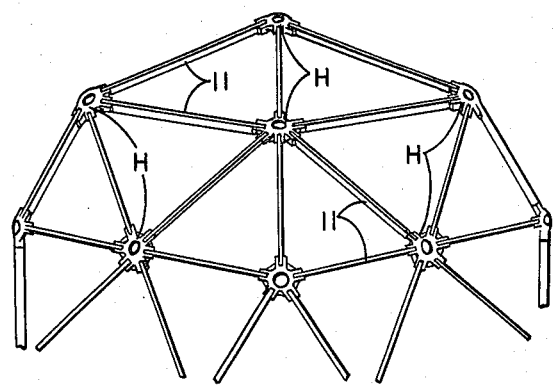
FIG. 1 is a perspective view showing a geodesic dome frame structure embodying this invention.

The slots S are spaced around said center opening A and each area between adjacent slots has a rigid web 12 interposed in fixed relation to the flanges to provide a circumferentially continuous rigid structural unit when each of the slots S is filled with the end portion of a stringer element, as best shown in FIGS. 1 and 2. These webs 12 are shorter than the flanges to provide some yieldability in the outer ends of the flanges 10. A pair of bolts 13 are provided to extend transversely through the stringers to connect the stringers to the flanges 10 in each of the slots, and the holes for said bolts through the flanges 10 can be positioned on opposite sides of the web elements 12 to provide a rigid structural unit. The yieldability in the flanges permits the bolts to tightly clamp the flanges against the stringers to provide maximum rigidity.

The connector hub H illustrated, may be manufactured in the form of a single integrally cast unit and is specifically designed to provide the required rigidity for a proper connection between the end portions of the stringer elements 11 attached thereto. It will be apparent that this invention provides an extremely efficient, relatively inexpensive structure, particularly designed to overcome the problems of the prior art. The inner ends of the stringers 11 are abutted against the sloping end surfaces 10a of each of the slots S and the bolts 13 extend transversely through the stringer members to provide maximum strength and rigidity for the connection between the hub H and the adjacent ends of the stringers 11.

What is claimed is:

1. A connector hub for geodesic dome frame members comprising, a central hub element with a plurality of pairs of spaced apart flange elements, each pair defining a stringer receiving slot for receiving the end portion of a stringer frame member, means for connecting the stringer frame members received in said slots, to the respective pair of flange elements, a plurality of stiffening web elements disposed between adjacent slots and connected with adjacent flange elements to form an extremely strong and rigid connector hub unit, said flange elements being constructed and arranged to permit slight flexing movement under clamping pressure, said stiffening webs terminating at intermediate portions of the length of said flange elements so that the outer end portions of said flange elements are free to flex slightly under clamping pressure, said connecting means including, at least one clamping bolt extending through said pair of flange elements and through a stringer received in the slot between each pair of flanges, and said clamping bolt being positioned in said outer end portions of said flanges to produce said clamping action against said stringer.

* * * * *